United States Patent
Zhang et al.

(10) Patent No.: US 11,502,343 B2
(45) Date of Patent: Nov. 15, 2022

(54) METHOD FOR DETECTING BATTERY CONDITION, ELECTRONIC DEVICE USING METHOD, AND NON-TRANSITORY STORAGE MEDIUM

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Jun-Wei Zhang, Zhengzhou (CN); Shi Jia, Zhengzhou (CN); Jun Zhang, Shenzhen (CN); Yi-Tao Kao, New Taipei (TW)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

(*) Notice: Subject to any disclaimer, the term of this patent is extended or adjusted under 35 U.S.C. 154(b) by 425 days.

(21) Appl. No.: 16/730,296

(22) Filed: Dec. 30, 2019

(65) Prior Publication Data
US 2021/0126297 A1    Apr. 29, 2021

(30) Foreign Application Priority Data
Oct. 25, 2019 (CN) .......................... 201911025331.X

(51) Int. Cl.
*H01M 10/48* (2006.01)
*G01K 13/00* (2021.01)

(52) U.S. Cl.
CPC .......... *H01M 10/486* (2013.01); *G01K 13/00* (2013.01)

(58) Field of Classification Search
None
See application file for complete search history.

(56) References Cited

U.S. PATENT DOCUMENTS

2020/0035082 A1*  1/2020  Lee .................... H01M 10/44

\* cited by examiner

*Primary Examiner* — Jas A Sanghera
(74) *Attorney, Agent, or Firm* — ScienBiziP, P.C.

(57) ABSTRACT

A method for detecting battery condition by monitoring air pressure and temperature both before and during the use of a sealed electronic device. A first air pressure is obtained before the device is powered on. A second air pressure is obtained during use of the device. A value of variations between readings is determined, and if the variation value in air pressure is greater than a preset value, an alarm is generated. An electronic device and a non-transitory storage medium are also provided.

17 Claims, 4 Drawing Sheets

METHOD FOR DETECTING BATTERY CONDITION, ELECTRONIC DEVICE USING METHOD, AND NON-TRANSITORY STORAGE MEDIUM

FIELD

The subject matter herein generally relates to batteries, and particularly, to a method for detecting battery condition, an electronic device using the method, and a non-transitory storage medium.

BACKGROUND

Improper usage of batteries or long usage may cause batteries to burn or explode. Initially, a ready-to-burned or ready-to-explode battery may appear to be bulging or show other visible signs. Given that a battery is usually installed inside an electronic device, it is hard to detect the bulging or other visible signs.

BRIEF DESCRIPTION OF THE DRAWINGS

Implementations of the present technology will now be described, by way of embodiment, with reference to the attached figures.

DETAILED DESCRIPTION

Figure 1:
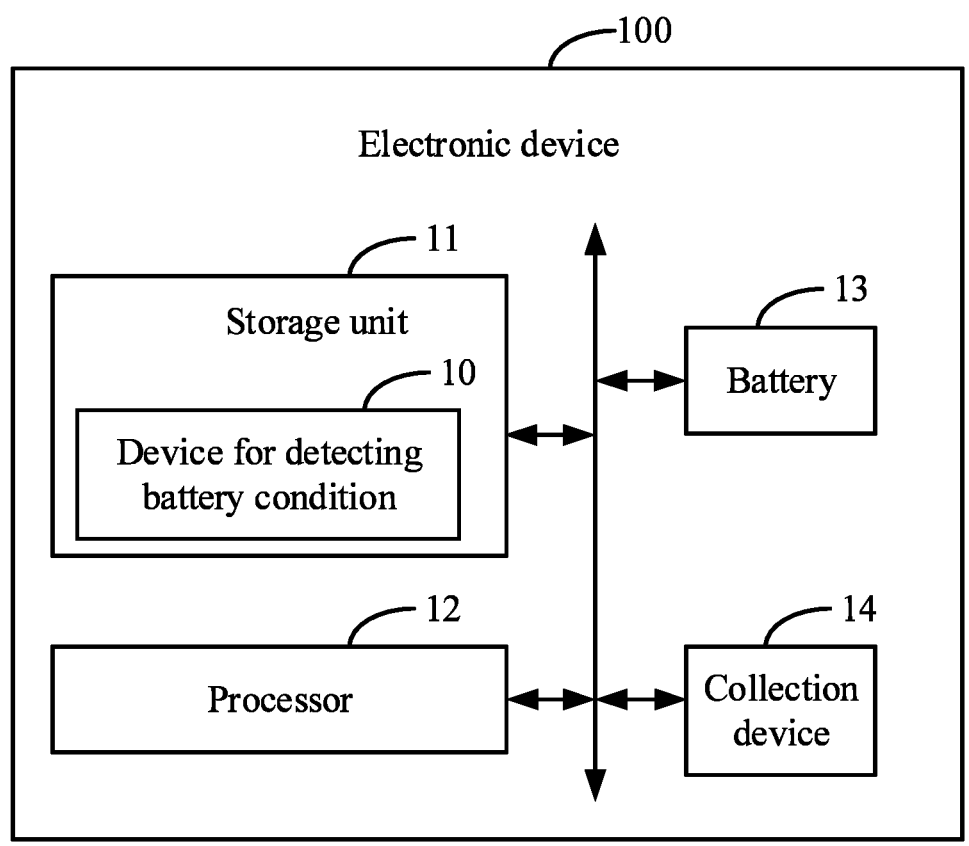
FIG. 1 illustrates a block view of an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts can be exaggerated to better illustrate details and features. The description is not to be considered as limiting the scope of the embodiments described herein.

Several definitions that apply throughout this disclosure will now be presented.

In general, the word "module" as used herein, refers to logic embodied in hardware or firmware, or to a collection of software instructions, written in a programming language. The software instructions in the modules can be embedded in firmware, such as in an erasable programmable read-only memory (EPROM) device. The modules described herein can be implemented as either software and/or hardware modules and can be stored in any type of computer-readable medium or other storage device.

The term "comprising" means "including, but not necessarily limited to"; it specifically indicates open-ended inclusion or membership in a so-described combination, group, series, and the like.

Embodiments of the present disclosure will be described with reference to the accompanying drawings.

FIG. 1 illustrates a block view of an embodiment of an electronic device. A device for detecting battery condition 10 is run on the electronic device 100. Interior of the electronic device 100 is a sealed space. The electronic device 100 includes, but is not limited to, a storage unit 11, at least one processor 12, a battery 13, and at least one collection device 14. The aforementioned components in the electronic device can be coupled to each other via a bus system or can be directly coupled to each other. The storage unit 11 stores the device for detecting battery condition 10.

FIG. 1 only illustrates the storage unit 11, the at least one processor 12, the battery 13, and the at least one collection device 14, in the electronic device 100 for simplicity. It can be understood that, the electronic device 100 can include more or fewer components than the FIG. 1 or include different components. The electronic device 100 can be a sealed electronic device where the battery is inside a sealed space of said device. For example, the electronic device 100 can be an electric motorcycle, an electric bicycle, an electric vehicle, a smart phone, a tablet computer, a personal digital assistant, a personal computer, or any suitable device.

In the embodiment, the battery 13 can provide power for the electronic device 100. For example, the battery 13 can be a lead-acid cell, a nickel-cadmium cell, a nickel-hydrogen cell, a lithium-ion cell, a lithium-polymer cell, a lithium iron phosphate cell, or the like. The battery 13 can be logically coupled to the at least one processor 12 via a battery management system. Thus, the battery 13 can achieve functions via the battery management system. The functions can be fully charged, be discharged, or the like.

In the embodiment, the at least one collection device 14 is arranged in the electronic device 100, and adjacent to the battery 13 or the at least one processor 12. The at least one collection device 14 can include at least one air pressure collection device or at least one temperature collection device. The at least one air pressure collection device is configured to collect an air pressure of an interior of the sealed electronic device. In the embodiment, the at least one air pressure collection device can be an air pressure sensor. It can be understood that, the air pressure collection device can be any other air pressure collection device. The at least one temperature collection device is configured to collect a temperature of the interior of the sealed electronic device. In the embodiment, the at least one temperature collection device can be a temperature sensor. It can be understood that, the temperature collection device can be any other temperature collection device. The electronic device can include other components, for example, a pressure sensor, a light sensor, a gyroscope, a hygrometer, an infrared sensor, and so on.

Figure 2:
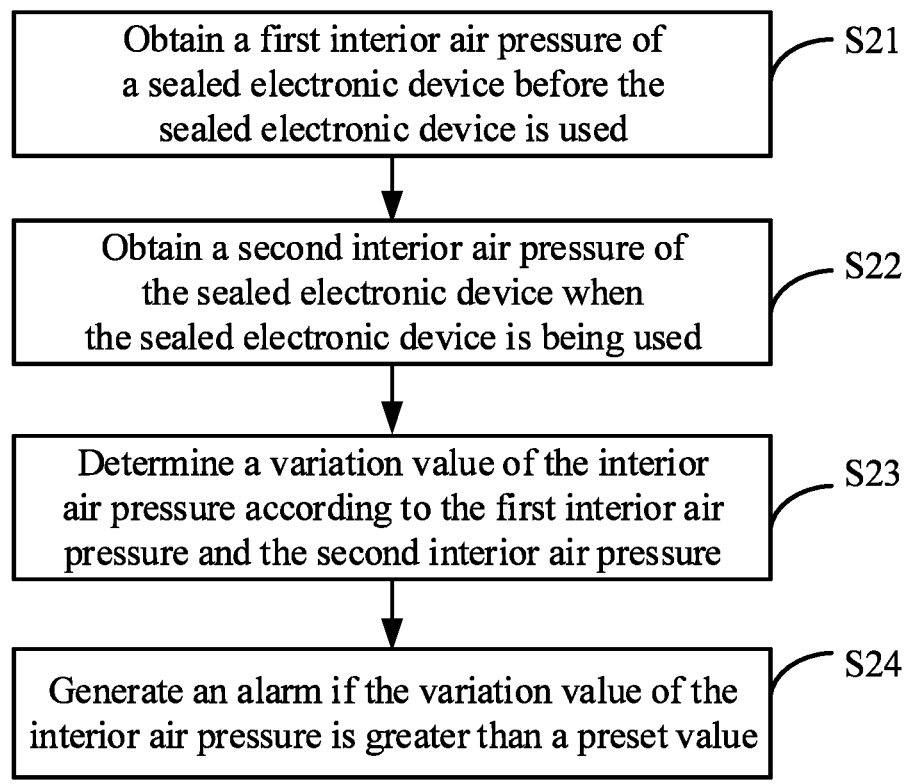
FIG. 2 illustrates a flowchart of an embodiment of a method for detecting battery condition.

FIG. 2 illustrates a flowchart of an embodiment of a method for detecting battery condition. The method for detecting battery condition can begin at block S21.

At the block S21, a first interior air pressure of a sealed electronic device is obtained before the sealed electronic device is used.

In the embodiment, before the sealed electronic device being used mean before the sealed electronic device is first powered on. Obtaining a first interior air pressure of a sealed electronic device before the sealed electronic device is used can include, obtaining the first interior air pressure of the sealed electronic device before the sealed electronic device is used via the at least one air pressure collection device.

In the embodiment, obtaining the first interior air pressure of the sealed electronic device before the sealed electronic device is used can include step a1 and step b1. Step a1 includes obtaining a plurality of interior air pressures of a sealed electronic device before the sealed electronic device is used. Step b1 includes determining an average value of the plurality of interior air pressures of a sealed electronic device before the sealed electronic device is used.

In the embodiment, the plurality of interior air pressures of a sealed electronic device before the sealed electronic device is used are the air pressures collected by the plurality of air pressure collection devices. The multiple interior air pressures of the sealed electronic device before the sealed electronic device is used ensures that the first interior air pressure of the sealed electronic device is accurate.

In the embodiment, obtaining a first interior air pressure can be done at first time intervals or randomly. Preferably, the first time interval can be ten minutes, or other value. The first time interval can be varied according to the need. The randomly can be obtaining at second time interval within a time period and obtaining at third time interval within other time periods. The randomly can be varied according to the need. Thus, the device can automatically adjust to obtain the first interior air pressure of the sealed electronic device before the sealed electronic device is used according to the need.

At block S22, obtaining a second interior air pressure of the sealed electronic device when the sealed electronic device is being used.

In the embodiment, the sealed electronic device is being used meaning the sealed electronic device after being first powered on. The sealed electronic device is being used while in a charged state, in a discharged state, or in an idle state.

In the embodiment, obtaining a second interior air pressure can include step a2 and step b2. Step a2 includes obtaining a plurality of interior air pressures of the sealed electronic device when the sealed electronic device is being used. Step b2 includes determining an average value of the plurality of interior air pressures of the sealed electronic device when the sealed electronic device is being used.

In the embodiment, the plurality of interior air pressures of the sealed electronic device when the sealed electronic device is being used are the interior air pressures collected by the plurality of air pressure collection devices. The air pressures of the sealed electronic device when the sealed electronic device is being used are collected via the plurality of air pressure collection devices, thus the second interior air pressure can be accurate.

In the embodiment, obtaining a second interior air pressure can be done at fourth time intervals or randomly. Preferably, the fourth time interval can be ten minutes, or other value. The fourth time interval can be varied according to the need. The randomly can be obtaining at fifth time interval within a time period and obtaining at sixth time interval within other time periods. The randomly can be varied according to the need. Thus, the device can automatically adjust to obtain the second interior air pressure of the sealed electronic device when the sealed electronic device is being used according to the need.

At block S23, determining a variation value of the interior air pressure according to the first interior air pressure and the second interior air pressure.

In the embodiment, determining a variation value of the interior air pressure can include determining that the variation value of the interior air pressure is a difference value between the first interior air pressure and the second interior air pressure.

For example, the first interior air pressure is ten pascals, and the second interior air pressure is eighteen pascals, thus the variation value is eight pascals.

In the embodiment, the method for detecting battery condition can further include step a3 and step b3. The step a3 includes obtaining a first interior temperature of the sealed electronic device before the sealed electronic device is used. The step b3 includes obtaining a second interior temperature of the sealed electronic device when the sealed electronic device is being used.

In the embodiment, the method further includes determining the variation value of the interior air pressure according to the first interior temperature and the second interior temperature.

In the embodiment, obtaining a first interior temperature can include obtaining the first interior temperature via the at least one temperature collection device.

In the embodiment, obtaining the first interior temperature can include step a4 and step b4. Step a4 includes obtaining a plurality of interior temperatures of the sealed electronic device before the sealed electronic device is used. Step b4 includes determining that the first interior temperature is an average value of the plurality of interior temperatures of the sealed electronic device before the sealed electronic device is used.

In the embodiment, the plurality of interior temperatures is the interior temperatures collected by the plurality of temperature collection devices. The plurality of temperature collection devices ensures that the first interior temperature of the sealed electronic device before the sealed electronic device is used can be accurate.

In the embodiment, obtaining a first interior temperature can be done at seventh time intervals or randomly. Preferably, the seventh time interval can be ten minutes, or other value. The seventh time interval can be varied according to the need. The randomly can be obtaining at eight time interval within a time period and obtaining at ninth time interval within other time periods. The randomly can be varied according to the need. Thus, the device can automatically adjust to obtain the first interior temperature of the sealed electronic device before the sealed electronic device is used according to the need.

In the embodiment, obtaining a second interior temperature can include step a5 and step b5. Step a5 includes obtaining a plurality of interior temperatures of the sealed electronic device when the sealed electronic device is being used. Step b5 includes determining that the second interior temperature is an average value of the plurality of interior temperatures of the sealed electronic device when the sealed electronic device is being used.

In the embodiment, the plurality of interior temperatures of the sealed electronic device when the sealed electronic device is being used are the temperatures collected by the plurality of temperature collection devices. The plurality of temperature collection devices ensures that the second interior temperature to be accurate.

In the embodiment, obtaining a second interior temperature of the sealed electronic device when the sealed electronic device is being used can be obtaining the second interior temperature of the sealed electronic device when the sealed electronic device is using at tenth time intervals or randomly. Preferably, the tenth time interval can be ten minutes, or other value. The tenth time interval can be varied according to the need. The randomly can be obtaining at eleventh time interval within a time period and obtaining at twelfth time interval within other time period. The randomly can be varied according to the need.

In the embodiment, determining the variation value of the interior air pressure according to the first interior temperature and the second interior temperature can include step a6 and step b6. Step a6 includes determining a compensation value of the interior air pressure according to the first interior temperature and the second interior temperature. Step b6 includes determining the variation value of the interior air pressure according to the compensation value of the interior air pressure, the first interior air pressure, and the second interior air pressure.

In the embodiment, determining a compensation value of the interior air pressure according to the first interior temperature and the second interior temperature can include step a7 and step b7. Step a7 includes determining a variation value of the interior temperature according to the first interior temperature and the second interior temperature. Step b7 includes determining the compensation value of the interior air pressure according to a compensation algorithm of the interior air pressure and the variation value of the interior temperature.

In the embodiment, the compensation algorithm of the interior air pressure can be $$P = \frac{\Delta t}{T},$$

where P is the compensation value of the interior air pressure, $\Delta t$ is the variation value of the interior temperature, and T is a compensation parameter of the interior air pressure. Preferably, the compensation parameter of the interior air pressure can be ten, or other value. The compensation parameter of the interior air pressure can be varied according to the need.

For example, the first interior temperature of the sealed electronic device before the sealed electronic device is used is twenty-five degrees, and the second interior temperature of the sealed electronic device when the sealed electronic device is being used is forty-five degrees, thus the compensation value of the interior air pressure can be determined according to $$P = \frac{\Delta t}{T} = \frac{20}{10},$$

namely the compensation value of the interior air pressure can be two.

In the embodiment, determining the variation value of the interior air pressure according to the compensation value of the interior air pressure, the first interior air pressure, and the second interior air pressure can include step a8 and step b8. Step a8 includes determining a difference value of the interior air pressure between the second interior air pressure and the compensation value of the interior air pressure. Step b8 includes determining that the variation value of the interior air pressure is a difference between the difference value of the interior air pressure and the first interior air pressure.

For example, the first interior air pressure of the sealed electronic device before the sealed electronic device is used is ten pascals, the first interior temperature of the sealed electronic device before the sealed electronic device is used is twenty-five degrees, the second interior air pressure of the sealed electronic device when the sealed electronic device is being used is eighteen pascals, and the second interior temperature of the sealed electronic device when the sealed electronic device is being used is forty-five degrees, thus the difference value of the interior air pressure is sixteen pascals, and the variation value of the interior air pressure is six pascals.

At block S24, generate an alarm if the variation value of the interior air pressure is greater than a preset value.

In the embodiment, the preset value can be a prestored value. Preferably, the preset value can be five, or other value. The preset value can be varied according to the need.

In the embodiment, the alarm can be a sound alarm, a light alarm, a display alarm, or the like. For example, generating the alarm via controlling the LED flash light to shine, or control the display to display, or the like.

In the embodiment, after generating an alarm, the method further includes prompting an operation of the user.

In the embodiment, prompting an operation of the user can be, for example, prompting the user to execute an emergency processing on the battery to be burned or exploded, or prompting the user that the battery appears a slight ageing and to keep a well charge-discharge habit on the battery, or prompting the user that the battery appears a serious ageing and to change the battery in time.

Figure 3:
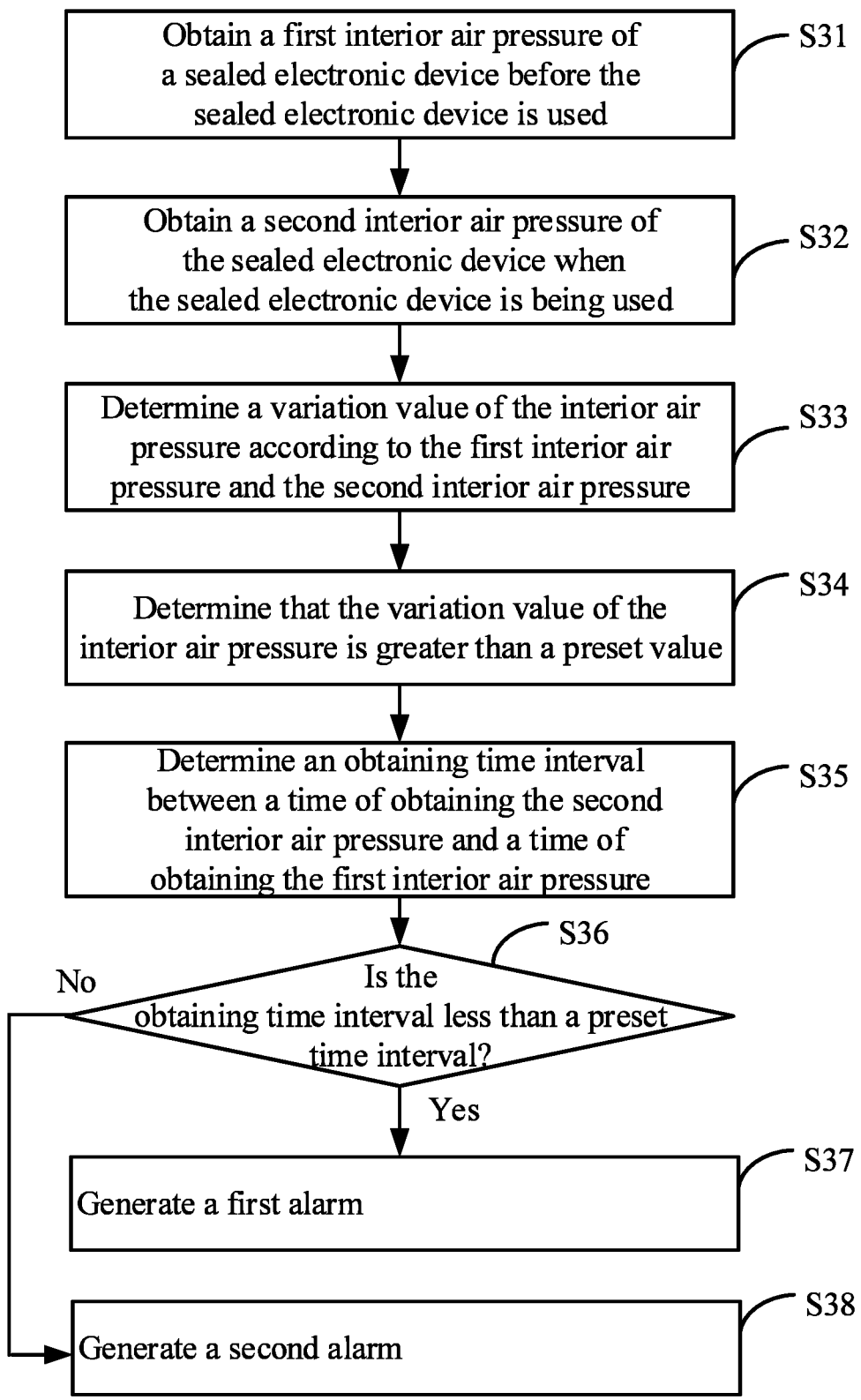
FIG. 3 illustrates a flowchart of another embodiment of a method for detecting battery condition.

FIG. 3 illustrates a flowchart of an embodiment of a method for detecting battery condition. The method for detecting battery condition begins at block S31.

At the block S31, obtaining a first interior air pressure of a sealed electronic device before the sealed electronic device is used.

The block S31 of the FIG. 3 is the same as the block S21 of the FIG. 2, the detail can refer to the related description of the block S21 of the FIG. 2, which will not be described herein.

At block S32, obtaining a second interior air pressure of the sealed electronic device when the sealed electronic device is being used.

The block S32 of the FIG. 3 is the same as the block S22 of the FIG. 2, the detail can refer to the related description of the block S22 of the FIG. 2, which will not be described herein.

At block S33, determining a variation value of the interior air pressure according to the first interior air pressure and the second interior air pressure.

The block S33 of the FIG. 3 is the same as the block S23 of the FIG. 2, the detail can refer to the related description of the block S23 of the FIG. 2, which will not be described herein.

At block S34, determining that the variation value of the interior air pressure is greater than a preset value.

In the embodiment, the preset value can be a prestored value. Preferably, the preset value can be five, or other value. The preset value can be varied according to the need.

At block S35, determining an obtaining time interval between a time of obtaining the second interior air pressure and a time of obtaining the first interior air pressure.

In the embodiment, determining an obtaining time interval between a time of obtaining the second interior air pressure and a time of obtaining the first interior air pressure can be not limited to be after determining that the variation value of the interior air pressure is greater than a preset value. Determining an obtaining time interval between a time of obtaining the second interior air pressure and a time of obtaining the first interior air pressure can be after other steps, for example, after obtaining a second interior air pressure of the sealed electronic device when the sealed electronic device is being used, or the like.

Determining an obtaining time interval between a time of obtaining the second interior air pressure and a time of obtaining the first interior air pressure can include step a9, step b9, and step c9. Step a9 includes determining the time of obtaining the first interior air pressure. Step b9 includes determining the time of obtaining the second interior air pressure. Step c9 includes determining the obtaining time interval between the time of obtaining the second interior air pressure and the time of obtaining the first interior air pressure according to the time of obtaining the first interior air pressure and the time of obtaining the second interior air pressure.

At block S36, determining whether the obtaining time interval is less than a preset time interval. If the obtaining time interval is less than the preset time interval, the procedure goes to step S37. If the obtaining time interval is equal to or greater than the preset time interval, the procedure goes to step S38.

In the embodiment, the preset time interval can be a prestored value. Preferably, the preset time interval can be five months, or other value. The preset time interval can be varied according to the need.

At block S37, generating a first alarm.

In the embodiment, generating a first alarm can be generating the alarm of high risk.

In the embodiment, after generating a first alarm, the method further includes prompting a first operation of the user.

In the embodiment, prompting the first operation of the user can include prompting the user to execute an emergency processing on the battery to be burned or exploded, for example, prompting the user to immediately disconnect a connection between the battery and the electronic device, or the like.

At block S38, generating a second alarm.

In the embodiment, generating a second alarm can be generating the alarm of low risk.

In the embodiment, after generating a second alarm, the method further includes prompting a second operation of the user.

In the embodiment, prompting the second operation of the user can be, for example, prompting the user that the battery appears an ageing, please keep a well charge-discharge habit on the battery, or change the battery in time, or the like.

In the embodiment, determining that the variation value of the interior air pressure is greater than a preset value can include determining that the variation value of the interior air pressure is greater than a first preset value and less than a second preset value, and prompting a second operation of the user can include prompting the user that the battery appears a slight ageing and to keep a well charge-discharge habit on the battery, or the like.

In the embodiment, determining that the variation value of the interior air pressure is greater than a preset value can include determining that the variation value of the interior air pressure is greater than the second preset value, and prompting a second operation of the user can include prompting the user that the battery appears a serious ageing and to change the battery in time, or the like.

Figure 4:
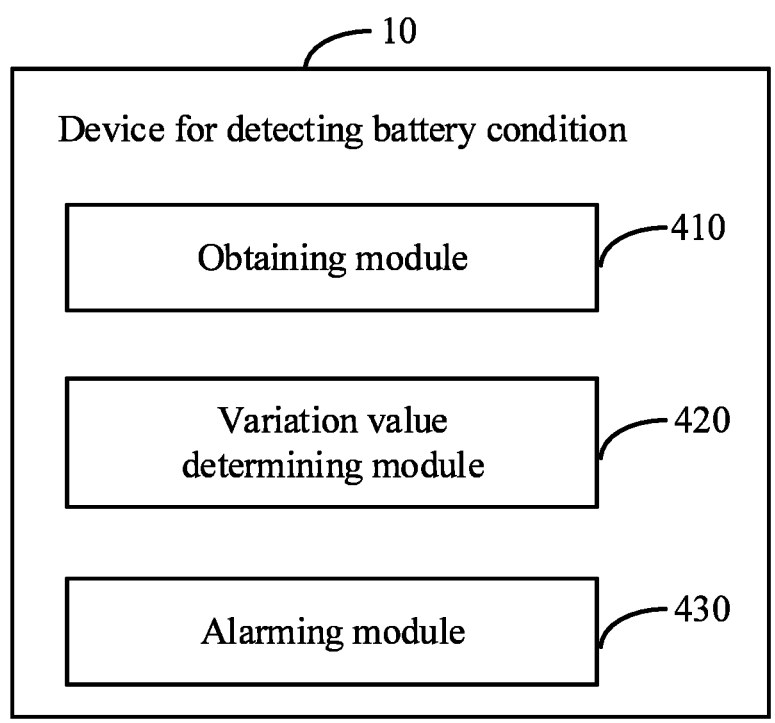
FIG. 4 illustrates a block view of an embodiment of a device for detecting battery condition.

FIG. 4 illustrates a block view of an embodiment of a device for detecting battery condition. The device for detecting battery condition 10 can be divided into one or more modules/units. Referring also to FIG. 1, the one or more modules/units can be stored in the storage unit 11 and executed by the at least one processor 12 to accomplish the object of the present disclosure. The one or more modules/units can be a series of program instruction segments which can perform specific functions, and the instruction segment is configured to describe the execution process of the device for detecting battery condition 10 in the electronic device 100. For example, the device for detecting battery condition 10 can be divided into an obtaining module 410, a variation value determining module 420, and an alarming module 430, as shown in the FIG. 4.

The obtaining module 410 is configured to obtain a first interior air pressure of a sealed electronic device before the sealed electronic device is used.

The obtaining module 410 is further configured to obtain a second interior air pressure of the sealed electronic device when the sealed electronic device is being used.

The variation value determining module 420 is configured to determining a variation value of the interior air pressure according to the first interior air pressure and the second interior air pressure.

The alarming module 430 is configured to generate an alarm if the variation value of the interior air pressure is greater than a preset value.

The device for detecting battery condition 10 can detect a condition of the battery. The detail can refer to the related description of the method for detecting battery condition of the FIGS. 2-3, which will not be described herein.

In the embodiment, the storage unit 11 can be an inner storage unit of the electronic device, namely a built-in storage unit in the electronic device. In other embodiments, the storage unit 11 can be an external storage unit of the electronic device 100, namely a storage unit coming out and coupled to the electronic device.

In the embodiment, the storage unit 11 stores the one or more programs and/or modules/units, for example, stores procedures of the device for detecting battery condition of the electronic device, and speedily and automatically accomplishes an access of the one or more programs and/or modules/units when the electronic device 100 run.

The storage unit 11 can include random access memory and non-transitory storage medium, such as hard disk, memory, plug-in hard disk, smart media card, secure digital, flash card, at least one disk storage device, flash memory, or other non-transitory storage medium.

In the embodiment, the at least one processor 12 can be one or more central processing units, or it can be one or more other universal processors, digital signal processors, application specific integrated circuits, field-programmable gate arrays, or other programmable logic devices, discrete gate or transistor logic, discrete hardware components, and so on. The at least one processor 12 can be a microprocessor or the at least one processor can be any regular processor, or the like.

If the integrated module/unit of the electronic device is implemented in the form of or by means of a software functional unit and is an independent product sold or used, all parts of the integrated module/unit of the electronic device may be stored in a computer-readable storage medium. The electronic device 100 can use one or more programs to control the related hardware to accomplish all parts of the methods of this disclosure. The one or more programs can be stored in a computer-readable storage medium. The one or more programs can be accomplish the block of the exemplary method when executing by the at least one processor 12. The one or more stored programs can include program code. The program code can be in the form of source code, object code, executable code file, or in some intermediate form. The computer-readable storage medium may include any entity or device capable of recording and carrying the program codes, recording media, USB flash disk, mobile hard disk, disk, computer-readable storage medium, read-only memory, Random access memory.

It is to be understood that the division of the unit is only one division of logical function, and the actual implementation may have an additional division manner. In addition, various functional units in the various embodiments of the disclosure may be integrated in one processing unit, each unit may be physically separated, or two or more units may be integrated in one unit. The above-mentioned integrated unit can be realized in the form of hardware or software functional unit.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. An electronic device comprising:
   a battery;
   at least one processor; and
   a storage system storing one or more programs, which when executed by the at least one processor, causes the at least one processor to:
   obtain a first interior air pressure of a sealed electronic device before the sealed electronic device is used;
   obtain a second interior air pressure of the sealed electronic device when the sealed electronic device is being used;
   determine a variation value of the interior air pressure according to the first interior air pressure and the second interior air pressure;
   generate an alarm if the variation value of the interior air pressure is greater than a preset value;
   determine that the variation value of the interior air pressure is greater than the preset value;
   determine an obtaining time interval between a time of obtaining the second interior air pressure and a time of obtaining the first interior air pressure;
   determine whether the obtaining time interval is less than a preset time interval; and
   generate a first alarm if the obtaining time interval is less than the preset time interval.

2. The electronic device according to claim 1, wherein the storage system further causes the at least one processor to:
   generate a second alarm if the obtaining time interval is equal to or greater than the preset time interval.

3. The electronic device according to claim 1, wherein the storage system further causes the at least one processor to:
   obtain a first interior temperature of the sealed electronic device before the sealed electronic device is used;
   obtain a second interior temperature of the sealed electronic device when the sealed electronic device is being used; and
   determine the variation value of the interior air pressure according to the first interior temperature and the second interior temperature.

4. The electronic device according to claim 3, wherein the storage system further causes the at least one processor to:
   determine a compensation value of the interior air pressure according to the first interior temperature and the second interior temperature; and
   determine the variation value of the interior air pressure according to the compensation value of the interior air pressure, the first interior air pressure, and the second interior air pressure.

5. The electronic device according to claim 4, wherein the storage system further causes the at least one processor to:
   determine a variation value of the interior temperature according to the first interior temperature and the second interior temperature; and
   determine the compensation value of the interior air pressure according to a compensation algorithm of the interior air pressure and the variation value of the interior temperature.

6. The electronic device according to claim 4, wherein the storage system further causes the at least one processor to:
   determine a difference value of the interior air pressure between the second interior air pressure and the compensation value of the interior air pressure; and
   determine that the variation value of the interior air pressure is a difference between the difference value of the interior air pressure and the first interior air pressure.

7. A method for detecting battery condition, wherein said method is implemented in a sealed electronic device with a battery, a storage system, and at least one processor, the method comprises:
   obtaining a first interior air pressure of the sealed electronic device before the sealed electronic device is used;
   obtaining a second interior air pressure of the sealed electronic device when the sealed electronic device is being used;
   determining a variation value of the interior air pressure according to the first interior air pressure and the second interior air pressure;
   generating an alarm if the variation value of the interior air pressure is greater than a preset value;
   determining that the variation value of the interior air pressure is greater than the preset value;
   determining an obtaining time interval between a time of obtaining the second interior air pressure and a time of obtaining the first interior air pressure;
   determining whether the obtaining time interval is less than a preset time interval; and
   generating a first alarm if the obtaining time interval is less than the preset time interval.

8. The method according to claim 7, further comprising:
   generating a second alarm if the obtaining time interval is equal to or greater than the preset time interval.

9. The method according to claim 7, further comprising:
   obtaining a first interior temperature of the sealed electronic device before the sealed electronic device is used;
   obtaining a second interior temperature of the sealed electronic device when the sealed electronic device is being used; and
   determining the variation value of the interior air pressure according to the first interior temperature and the second interior temperature.

10. The method according to claim 9, further comprising:
    determining a compensation value of the interior air pressure according to the first interior temperature and the second interior temperature; and
    determining the variation value of the interior air pressure according to the compensation value of the interior air pressure, the first interior air pressure, and the second interior air pressure.

11. The method according to claim 10, further comprising:
- determining a variation value of the interior temperature according to the first interior temperature and the second interior temperature; and
- determining the compensation value of the interior air pressure according to a compensation algorithm of the interior air pressure and the variation value of the interior temperature.

12. The method according to claim 10, further comprising:
- determining a difference value of the interior air pressure between the second interior air pressure and the compensation value of the interior air pressure; and
- determining that the variation value of the interior air pressure is a difference between the difference value of the interior air pressure and the first interior air pressure.

13. A non-transitory storage medium storing a set of instructions, when the instructions being executed by at least one processor of an electronic device, causing the at least one processor to:
- obtain a first interior air pressure of a sealed electronic device before the sealed electronic device is used;
- obtain a second interior air pressure of the sealed electronic device when the sealed electronic device is being used;
- determine a variation value of the interior air pressure according to the first interior air pressure and the second interior air pressure;
- generate an alarm if the variation value of the interior air pressure is greater than a preset value;
- determine that the variation value of the interior air pressure is greater than the preset value;
- determine an obtaining time interval between a time of obtaining the second interior air pressure and a time of obtaining the first interior air pressure;
- determine whether the obtaining time interval is less than a preset time interval; and
- generate a first alarm if the obtaining time interval is less than the preset time interval.

14. The non-transitory storage medium according to claim 13, further causing the at least one processor to:
- generate a second alarm if the obtaining time interval is equal to or greater than the preset time interval.

15. The non-transitory storage medium according to claim 13, further causing the at least one processor to:
- obtain a first interior temperature of the sealed electronic device before the sealed electronic device is used;
- obtain a second interior temperature of the sealed electronic device when the sealed electronic device is being used; and
- determine the variation value of the interior air pressure according to the first interior temperature, and the second interior temperature.

16. The non-transitory storage medium according to claim 15, further causing the at least one processor to:
- determine a compensation value of the interior air pressure according to the first interior temperature and the second interior temperature; and
- determine the variation value of the interior air pressure according to the compensation value of the interior air pressure, the first interior air pressure, and the second interior air pressure.

17. The non-transitory storage medium according to claim 16, further causing the at least one processor to:
- determine a variation value of the interior temperature according to the first interior temperature and the second interior temperature; and
- determine the compensation value of the interior air pressure according to a compensation algorithm of the interior air pressure and the variation value of the interior temperature.

* * * * *